(12) United States Patent
Kronberger et al.

(10) Patent No.: US 8,668,066 B2
(45) Date of Patent: Mar. 11, 2014

(54) SINTERED COUPLING RING

(75) Inventors: Christian Kronberger, Vorchdorf (AT); Horst Roessler, Wels (AT); Christian Sandner, Gmunden (AT)

(73) Assignee: Miba Sinter Austria GmbH, Laakirchen (AT)

( * ) Notice: Subject to any disclaimer, the term of this patent is extended or adjusted under 35 U.S.C. 154(b) by 323 days.

(21) Appl. No.: 12/998,970

(22) PCT Filed: Oct. 6, 2010

(86) PCT No.: PCT/AT2010/000371
§ 371 (c)(1),
(2), (4) Date: Jun. 20, 2011

(87) PCT Pub. No.: WO2011/041811
PCT Pub. Date: Apr. 14, 2011

(65) Prior Publication Data
US 2011/0253499 A1 Oct. 20, 2011

(30) Foreign Application Priority Data
Oct. 7, 2009 (AT) .................. A 1581/2009

(51) Int. Cl.
B21K 1/30 (2006.01)
F16D 11/14 (2006.01)
B22F 3/16 (2006.01)
B22F 5/08 (2006.01)

(52) U.S. Cl.
USPC ............ 192/108; 192/69.7; 72/343; 148/514; 419/1

(58) Field of Classification Search
USPC .......................... 192/69.7, 69.83, 108, 114 T
See application file for complete search history.

(56) References Cited

U.S. PATENT DOCUMENTS

| | | | |
|---|---|---|---|
| 3,043,414 A * | 7/1962 | Peras | 192/114 T |
| 4,727,968 A * | 3/1988 | Chana | 192/108 |
| 5,105,522 A | 4/1992 | Gramberger et al. | |
| 5,960,925 A | 10/1999 | Helms et al. | |
| 6,974,012 B2 | 12/2005 | Rau et al. | |
| 7,810,625 B2 | 10/2010 | Nelböck et al. | |
| 2009/0317582 A1 | 12/2009 | Schmid et al. | |

FOREIGN PATENT DOCUMENTS

| | | |
|---|---|---|
| AT | 409 234 | 6/2002 |
| DE | 38 39 800 | 5/1990 |
| DE | 101 64 203 | 4/2003 |
| DE | 102 47 330 | 4/2004 |
| DE | 10 2005 008 441 | 8/2006 |
| EP | 0 393 011 | 10/1990 |
| EP | 0 846 883 | 6/1998 |
| EP | 2 080 936 | 7/2009 |
| JP | 2-129304 | 5/1990 |

(Continued)

OTHER PUBLICATIONS

International Search Report of PCT/AT2010/000371, Jan. 26, 2011.

*Primary Examiner* — Rodney Bonck
(74) *Attorney, Agent, or Firm* — Collard & Roe, P.C.

(57) ABSTRACT

A sintered coupling ring (1) is described, comprising a ring of coupling teeth (2) which comprise relieved flanks (4) extending from wedge-shaped end faces (3) and, on the side opposite the wedge-shaped end faces (3), a stop (5) that protrudes radially beyond the tooth tip (6). In order to provide advantageous constructional conditions it is proposed that the stops (5) have a greater density than the remaining tooth tip (6).

5 Claims, 3 Drawing Sheets

(56) References Cited

FOREIGN PATENT DOCUMENTS

| | | |
|---|---|---|
| JP | 2009-167477 | 7/2009 |
| WO | WO 2004/030851 | 4/2004 |
| WO | WO 2006/066287 | 6/2006 |

* cited by examiner

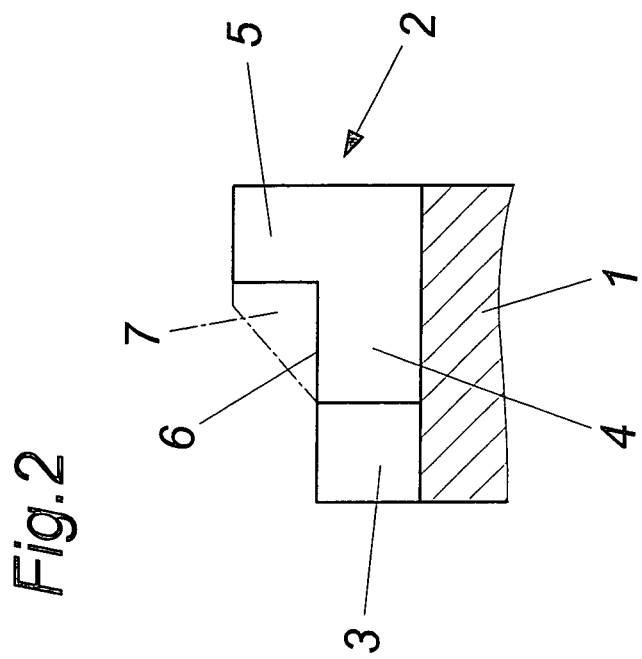
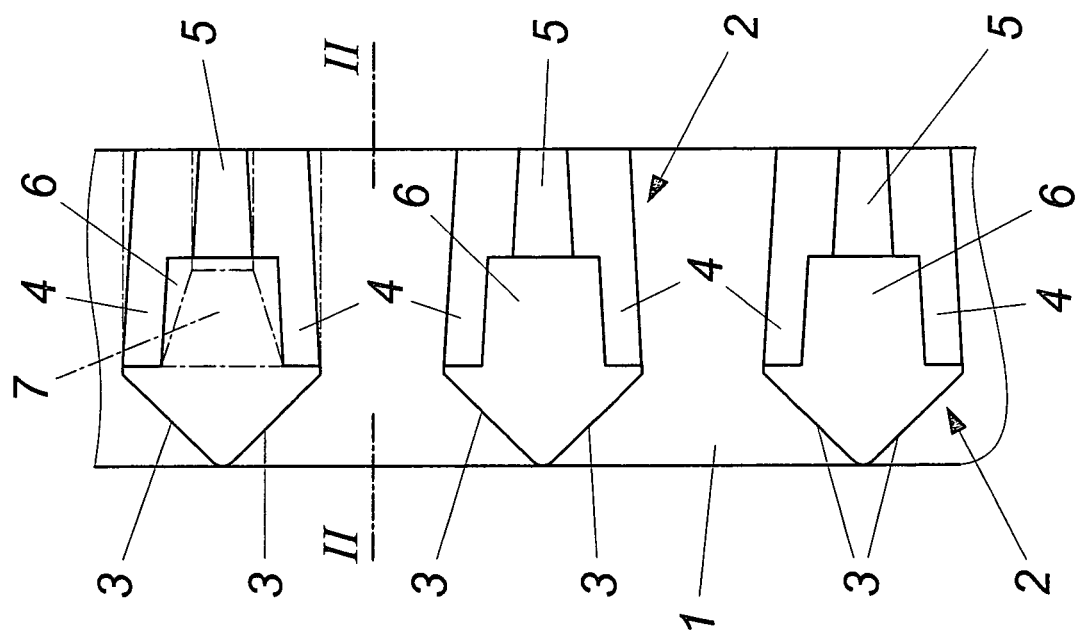

SINTERED COUPLING RING

CROSS REFERENCE TO RELATED APPLICATIONS

This application is the National Stage of PCT/AT2010/000371 filed on Oct. 6, 2010, which claims priority under 35 U.S.C. §119 of Austrian Application No. A 1581/2009 filed on Oct. 7, 2009, the disclosure of which is incorporated by reference. The international application under PCT article 21(2) was not published in English.

FIELD OF THE INVENTION

The invention relates to a sintered coupling ring, comprising a ring of coupling teeth which comprise relieved flanks extending from wedge-shaped end faces and, on the side opposite the wedge-shaped end faces, a stop that protrudes radially beyond the tooth tip.

DESCRIPTION OF THE PRIOR ART

Manual transmissions for motor vehicles comprise coupling rings co-operating with a selector sleeve, the coupling teeth of which form front faces which extend in the manner of a roof, are arranged in the manner of a wedge and facilitate the engagement of the claws of the selector sleeve into the ring gear of the coupling ring. As a result of the profile relief of the coupling teeth, the engagement position of the claws of the selector sleeve in the axial direction is secured. In order to produce the profile relief, the coupling teeth are subjected to press-forming (WO 2006/066287 A1) during production by powder metallurgy after sintering of the coupling ring between two molds of a forming tool which are axially pressed against one another. If it is required that the selector sleeve is limited in its axial movement by the coupling ring because the pitch diameter of the coupling teeth of the coupling ring is larger than that of the teeth of the gearwheel to be engaged, the coupling teeth of the coupling ring are provided with a stop radially protruding beyond the tooth tip on the face side opposite of the wedge-shaped end faces. These stops are produced by machining of the sintered coupling teeth which are produced with a respective excess portion, which not only entails an additional production effort but also entails the likelihood of breakage of the stops when the selector sleeve hits the stops at higher speed.

SUMMARY OF THE INVENTION

The invention is therefore based on the object of providing a sintered coupling ring of the kind mentioned above in such a way that the stops protruding radially beyond the tooth tip can be produced by means of powder metallurgy without having to take any likelihood of breakage into account.

This object is achieved by the invention in such a way that the stops have a higher density than the remaining tooth tip.

As a result of the higher density of the stops in comparison with the remaining tooth tip, the loading capacity of these stops is increased considerably, so that the stops are certainly capable of withstanding the loads caused by the shifting processes as a result of the axial movement the selector sleeve. Aftertreatment by machining of the coupling teeth of the coupling ring can therefore be omitted, which therefore leads to comparatively simple production conditions. Especially advantageous constructional conditions are obtained in this connection when the stops have a width which corresponds at least to the thickness of the tooth tip, because in this case the stop surface is subjected to a lower specific load.

In order to produce a coupling ring with an annulus of coupling teeth which comprise flanks that are relieved and that extend from wedge-shaped end faces and, on the side opposite the wedge-shaped end faces, a stop that protrudes radially beyond the tooth tip, the stops need to be pressed and sintered with a respective excess portion for compression in order to compress the stops sintered with an excess portion during the calibration process to the reference dimension during calibration of the sintered coupling ring between two axially acting molds of a calibration tool. In order to ensure that the powder blank for the later coupling ring can be pressed in a respective manner in the region of the stops, it needs to be ensured that there is a gradual transition from the tooth tip to the stops in the region of the excess portion of the stops, which ensures an increased density in this transitional region during subsequent calibration of the sintered coupling ring and thus a decisive reduction in the likelihood of breakage. The form-pressing of small areas to high-density of the sintered material leads to the likelihood of overloading the pressing tools. It is advantageous for this reason that the stops have a width corresponding at least to the thickness of the tooth tip and therefore have a larger stop surface for absorbing the occurring impact loads, so that the compression during calibration can occur at a lower level as a result of the lower specific loading of these stops.

It is necessary as a result of the formation of tooth tips with radially protruding stops on the face side of the coupling teeth opposite of the wedge-shaped end faces to arrange the mold for accommodating the wedge-shaped end faces with mold protrusions which protrude along the tooth tips against the stops and which engage in respective recesses of the mold for producing the profile relief. A stepped dividing surface is thus obtained between the two molds in the region of the stops of the coupling teeth because the mold protrusions for the axial compression of the stops protrude over the otherwise continuous, axially normal dividing surface which extends along the transition between the wedge-shaped end faces and the flanks that are subsequently relieved. Since the molds of the calibration tool are also subject to elastic radial deformation as a result of the axial loads during the calibration process, there is a likelihood that the mold protrusions of the one mold will get jammed in the associated recesses in the other mold, which might lead to a breakage of the mold protrusions. In order to prevent this likelihood of breakage, the mold receiving the wedge-shaped end faces of the coupling teeth can form respective mold protrusions for the face side of the stops, which mold protrusions protrude beyond the dividing surface determined by the transitional area between the wedge-shaped end faces and the relieved flanks, and the opposite mold can form respective recesses for said mold protrusions, with the mold protrusions of the one mold and the recesses for the mold protrusions in the other mold converge into the dividing surface by way of wedge surfaces extending in the radial direction. As a result of these wedge surfaces extending in the radial direction, a radial widening of the molds of the calibration tool causes a slight movement in the axial direction which prevents jamming of the mold protrusions in the recesses and subsequently a breakage of the mold.

BRIEF DESCRIPTION OF THE DRAWINGS

The subject matter of the invention is shown in the drawings by way of example, wherein:

FIG. 1 shows a sintered coupling ring in accordance with the invention after the calibration in a sectional top view on the development of the coupling ring gear;

FIG. 2 shows a sectional view along the line II-II of FIG. 1;

DESCRIPTION OF THE PREFERRED EMBODIMENTS

Figure 3:
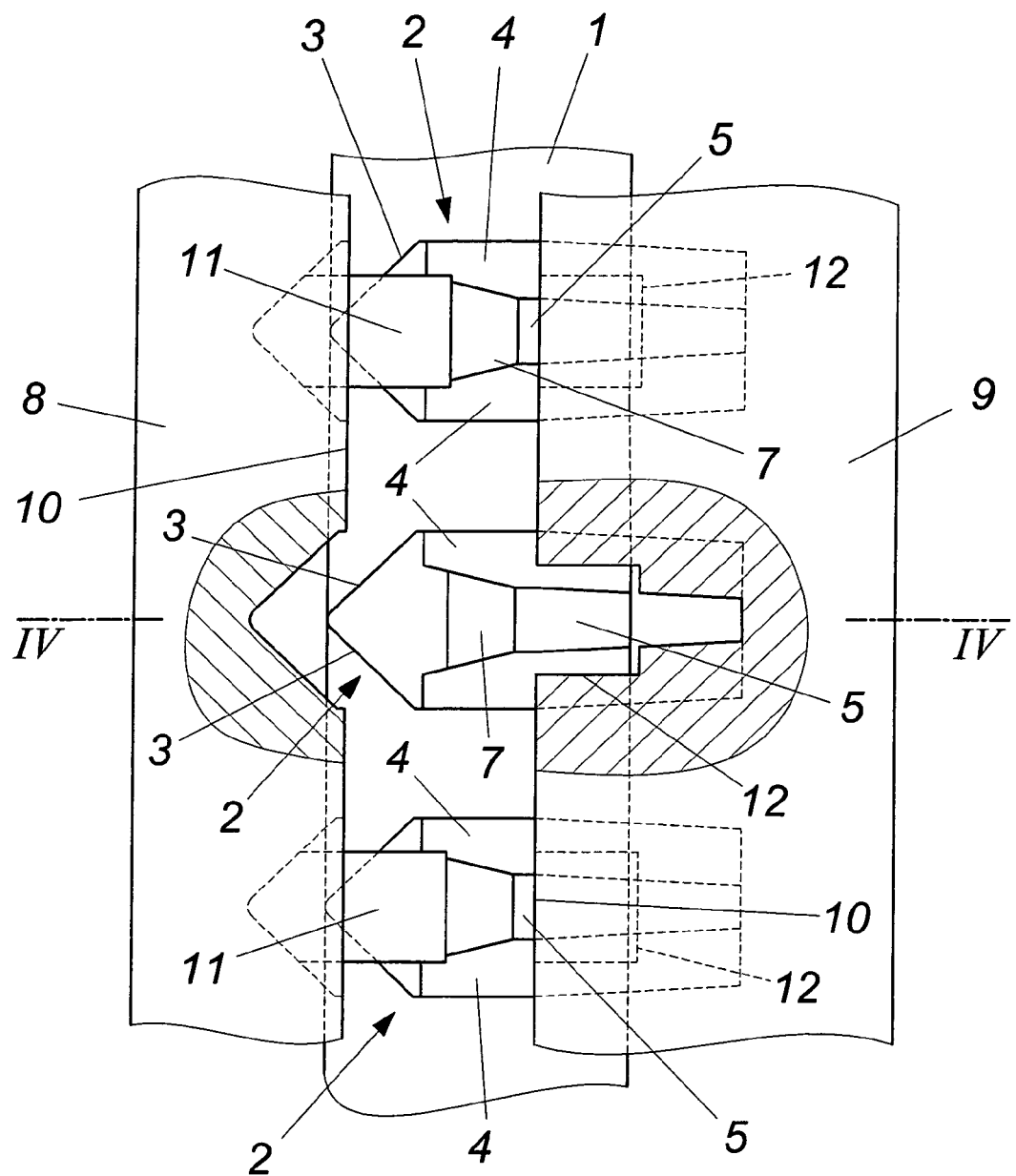
FIG. 3 shows an illustration of the sintered coupling ring according to FIG. 1 between the partly opened molds of a calibration tool.

In accordance with FIGS. 1 and 2, the sintered coupling ring 1 comprises a ring of coupling teeth 2 which form wedge-shaped end faces 3 on a face side. Relieved tooth flanks 4 are adjacent to these end faces 3. In order to limit the axial movement of a selector sleeve cooperating with the coupling ring 1, the coupling teeth 2 are provided with stops 5 on the face side opposite of the wedge-shaped end faces 3, which stops protrude radially beyond the tooth tip 6, as is shown especially in FIG. 2.

A powder blank is pressed and sintered at first for producing such a coupling ring 1, the coupling teeth 2 of which are provided with axially parallel flanks, as is indicated in FIG. 1 in a dot-dash line for a coupling tooth. Furthermore, the stops 5 are pressed and sintered with an excess portion 7, which is also shown in FIG. 2 with dot-dash line. During the calibration of the sintered formed body, the profile reliefs are form-pressed on the one hand and the stops 5 are compressed on the other hand, in that the excess portion 7 is pressed to the reference dimension by the calibration tool.

Figure 4:
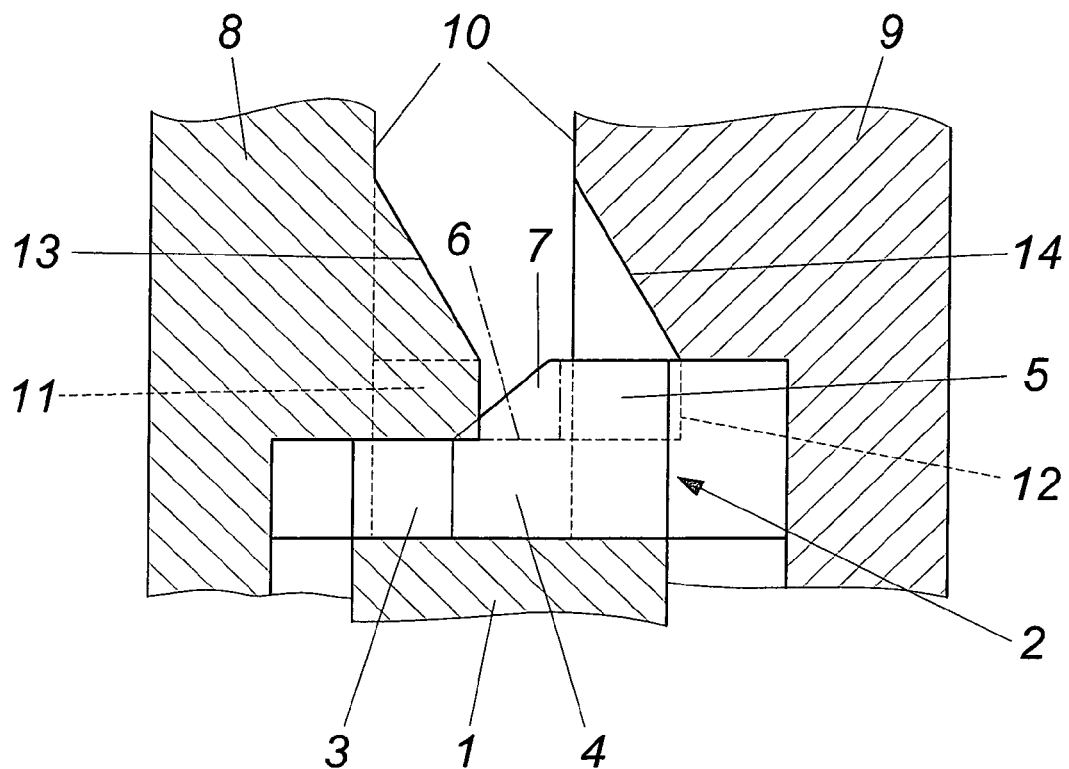
FIG. 4 shows a sectional line along the line IV-IV of FIG. 3.

The calibration tool shown in FIGS. 3 and 4 comprises two molds 8 and 9, the dividing surfaces 10 of which are disposed substantially in a plane perpendicular to the axis of the coupling ring 1, which plane extends along the transition between the wedge-shaped end faces 3 and the adjacent flanks 4 of the coupling teeth 2. The mold 8 which accommodates the wedge-shaped end faces 3 comprises mold protrusions 11 which protrude beyond said plane perpendicularly to the axis of the coupling ring 1 towards the opposite mold 9 provided for forming the profile relief in order to compress the stops 5 according to the excess portion 7 with the help of said mold protrusions 11 which engage in respective recesses 12 of the mold 9. After the calibration process which is completed with the closure of the two molds 8, 9, the calibration tool can be opened and the finished coupling ring 1 can be removed, the coupling teeth 2 of which comprise a respective profile relief and stops 5 which protrude radially beyond the tooth tip 6 and which have a higher density than the remaining tooth tip 7 which is caused by pressing the respective excess portion 7.

As is shown in FIG. 4, the mold protrusions 11 which are indicated by the broken line converge into the dividing surface 10 via the wedge surfaces 13. Similarly, the recesses 12 are provided with wedge-shaped transitional areas 14 towards the dividing surface 10. During the closure of the molds 8, 9 and the therefore resulting reaction forces on these molds 8, 9 caused by the calibration of the coupling ring 1, it is ensured that the molds 8, 9 which also elastically deform in the radial direction under axial load are also capable of a slight axial displacement along the wedge surfaces 13, 14, which concerning the accuracy of the shape does not play any role but effectively prevents jamming of the mold protrusions 11 in the recesses 12, so that the likelihood of breakage of the calibration tool can be reduced decisively.

The specific loading of the stops 5 depends on the stops surface that absorbs the load. The smaller this stops surface, the higher the strengths required for absorbing the loads, which accordingly requires higher densities of the stops 5. In order to reduce the specific load, the stop surface of the stops 5 must be enlarged, which is easily possible due to the production of the coupling rings by means of powder metallurgy.

Figure 5:
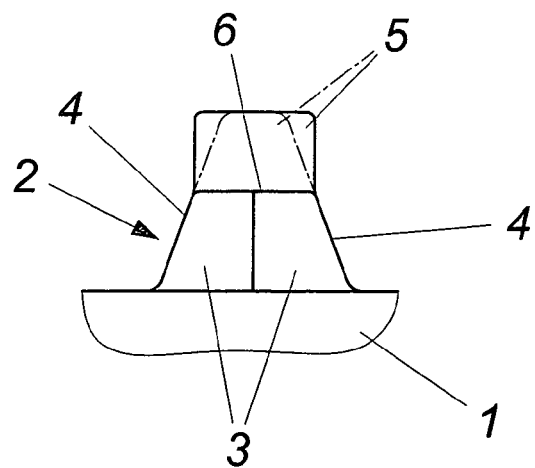
FIG. 5 shows a tooth of the coupling ring in a front view of the face side.

FIG. 5 shows a coupling tooth 2 in a front view of the wedge-shaped end faces 3. The stop 5 which is shown with the unbroken lines and which rises in the radial direction beyond the tooth tip 6 shows a considerably enlarged stop surface as a result of a width adjusted to the thickness of the tooth tip 6 in comparison with a stop 5 which is indicated with the dot-dash line and is adjusted to the decreasing progression of the tooth flank, so that a lower compression of this widened stop 5 is possible without endangering the required loading capacity. The lower compression further protects the calibration tools, thus improving their service life.

The invention claimed is:

1. A sintered coupling ring, comprising a ring (1) of coupling teeth (2) which comprise relieved flanks (4) extending from wedge-shaped end faces (3) and, on a side opposite the wedge-shaped end faces (3), stops (5) that protrudes radially beyond the tooth tips (6), wherein the stops (5) have a greater density than the tooth tips (6).

2. A sintered coupling ring according to claim 1, wherein the stops (5) have a width on a face side which corresponds at least to the thickness of the tooth tips (6).

3. A method for producing a coupling ring by means of powder metallurgy, the coupling ring comprising a ring of coupling teeth which comprise relieved flanks extending from wedge-shaped end faces and, on the side opposite the wedge-shaped end faces, stops that protrudes radially beyond tips of the teeth, the method comprising:
   sintering the coupling ring from a pressed powder blank, and
   calibrating the pressed powder blank between two axially acting calibration tools,
   wherein the powder blank is pressed and sintered in the axial direction with an excess portion (7) in a region of the stops (5) protruding radially beyond the tooth tips (6), and
   wherein the stops (5) sintered with an excess portion (7) are compressed to a reference dimension during the step of calibrating.

4. A method according to claim 3, wherein the powder blank is pressed and sintered with the stops (5) which have a width on a face side which corresponds at least to the thickness of the tooth tips (6).

5. A calibration tool for producing a sintered coupling ring, the coupling ring comprising a ring of coupling teeth with relieved flanks extending from wedge-shaped end faces and stops protruding radially beyond the tooth tips on the side opposite of the wedge-shaped end faces, the calibration tool comprising:
   two molds which configured to be axially pressed against one another and accommodate the coupling ring between themselves, of which one mold forms a hollow mold for the coupling teeth in the region of the wedge-shaped end faces and the other mold forms a hollow mold for the coupling teeth in the region of the relieved flanks, with a dividing surface between the two molds extending along a transition between the wedge-shaped end faces and the adjacent relieved flanks,
   wherein the mold (8) accommodating the wedge-shaped end faces (3) of the coupling teeth (2) forms mold protrusions (11) for a face side of the stops (5) which protrude beyond a dividing surface (10) determined by a transitional region between the wedge-shaped end faces (3) and the relieved flanks (4), and wherein the mold protrusions (11) and recesses (12) for the mold protrusions (11) converge into the dividing surface (10) via wedge surfaces (13, 14) extending in the radial direction.

\* \* \* \* \*